United States Patent
Feinstein et al.

(10) Patent No.: US 10,623,251 B2
(45) Date of Patent: Apr. 14, 2020

(54) PRIVATE NETWORK DRIVEN HOSTED NETWORK DEVICE MANAGEMENT

(71) Applicant: Cisco Technology, Inc., San Jose, CA (US)

(72) Inventors: Joel Feinstein, San Diego, CA (US); Justin Joel Delegard, San Francisco, CA (US); Adam Weis, San Francisco, CA (US); Robert Tristan Shanks, San Mateo, CA (US); Dan Aguayo, San Francisco, CA (US); Patrick Douglas Verkaik, San Francisco, CA (US); Dylan Jason Koenig, San Francisco, CA (US); Jacob Corr Valentic, San Jose, CA (US); Arthur Po-Hsiang Huang, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 229 days.

(21) Appl. No.: 14/924,463

(22) Filed: Oct. 27, 2015

(65) Prior Publication Data

US 2017/0118074 A1    Apr. 27, 2017

(51) Int. Cl.
*G06F 15/173* (2006.01)
*H04L 12/24* (2006.01)
*H04L 29/08* (2006.01)
*H04L 12/26* (2006.01)

(52) U.S. Cl.
CPC ........ *H04L 41/082* (2013.01); *H04L 41/0866* (2013.01); *H04L 67/2842* (2013.01); *H04L 41/5009* (2013.01); *H04L 43/0811* (2013.01)

(58) Field of Classification Search
None
See application file for complete search history.

(56) References Cited

U.S. PATENT DOCUMENTS

| 9,106,527 | B1* | 8/2015 | Cook | H04L 41/08 |
| 2006/0173997 | A1* | 8/2006 | Tullberg | H04L 29/12509 709/224 |
| 2013/0290512 | A1* | 10/2013 | Ngoo | H04L 41/147 709/224 |
| 2015/0099461 | A1* | 4/2015 | Holden | G01C 21/367 455/39 |
| 2017/0017679 | A1* | 1/2017 | Jurowicz | G06F 17/30377 |

* cited by examiner

*Primary Examiner* — Phyllis A Book
*Assistant Examiner* — Anh Nguyen
(74) *Attorney, Agent, or Firm* — Polsinelli PC

(57) ABSTRACT

Various implementations disclosed herein provide private network driven hosted network device management that enables more robust management of private networks that include such equipment. For example, in some implementations, a method of private network driven hosted network device management includes receiving a fetch request from a compliant device, wherein the fetch request indicates demand for at least one of new and updated configuration data and instructions. In turn, the method further includes assessing whether or not the new and updated configuration data and instructions, for the requesting compliant device, will conflict with local customizations and indicate potential disruption to connectivity and services in an associated private network, in order to produce an assessment result. The method also includes selectively generating a new configuration file including a suitable set of new and updated configuration data and instructions based on the assessment result.

20 Claims, 5 Drawing Sheets

PRIVATE NETWORK DRIVEN HOSTED NETWORK DEVICE MANAGEMENT

TECHNICAL FIELD

The present disclosure generally relates to improving the stability of private networks, and in particular, of private networks relying on hosted network device management.

BACKGROUND

The ongoing development of data networks often involves incorporating new functionality, improving connectivity and enabling local administrative customization using both previously deployed equipment and newly provisioned networking equipment. As a result, typical data networks, from local area networks (LANs) to virtual LANs and wide area networks (WANs), often include an amalgamation of various types of networking equipment. For example, a typical LAN often includes equipment from various vendors, equipment that is operable in accordance with particular standards, and equipment of different generations.

One type of equipment is configured to operate in coordination with a hosted network management system provided by the equipment vendor. The vendor-provided hosted network management system provides services and remote management, by way of new or updated configuration data and instructions to compliant devices. However, providing hosted services and management to compliant devices operating within customized private data networks presents a number of challenges. Compliant devices of this type rely on regularly receiving new or updated configuration data and instructions that are provided by the hosted network management system. At the same time, a private network that has been customized in particular performance areas can be disrupted by configuration pushes from the hosted network management system to compliant devices included in the private network. As a result, configuration pushes can cause connectivity and service failures within the private network. Additionally, compliant devices are also sometimes configured to pull new or updated configuration data and instructions from the hosted network management system in a variety of circumstances. Configuration pulls of this type can bypass local control mechanisms when compliant devices reboot or have been newly provisioned within the private network. Thus, similar to vendor-initiated pushes, pulls (or fetches) of new or updated configuration data and instructions can cause connectivity and service failures in the private network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
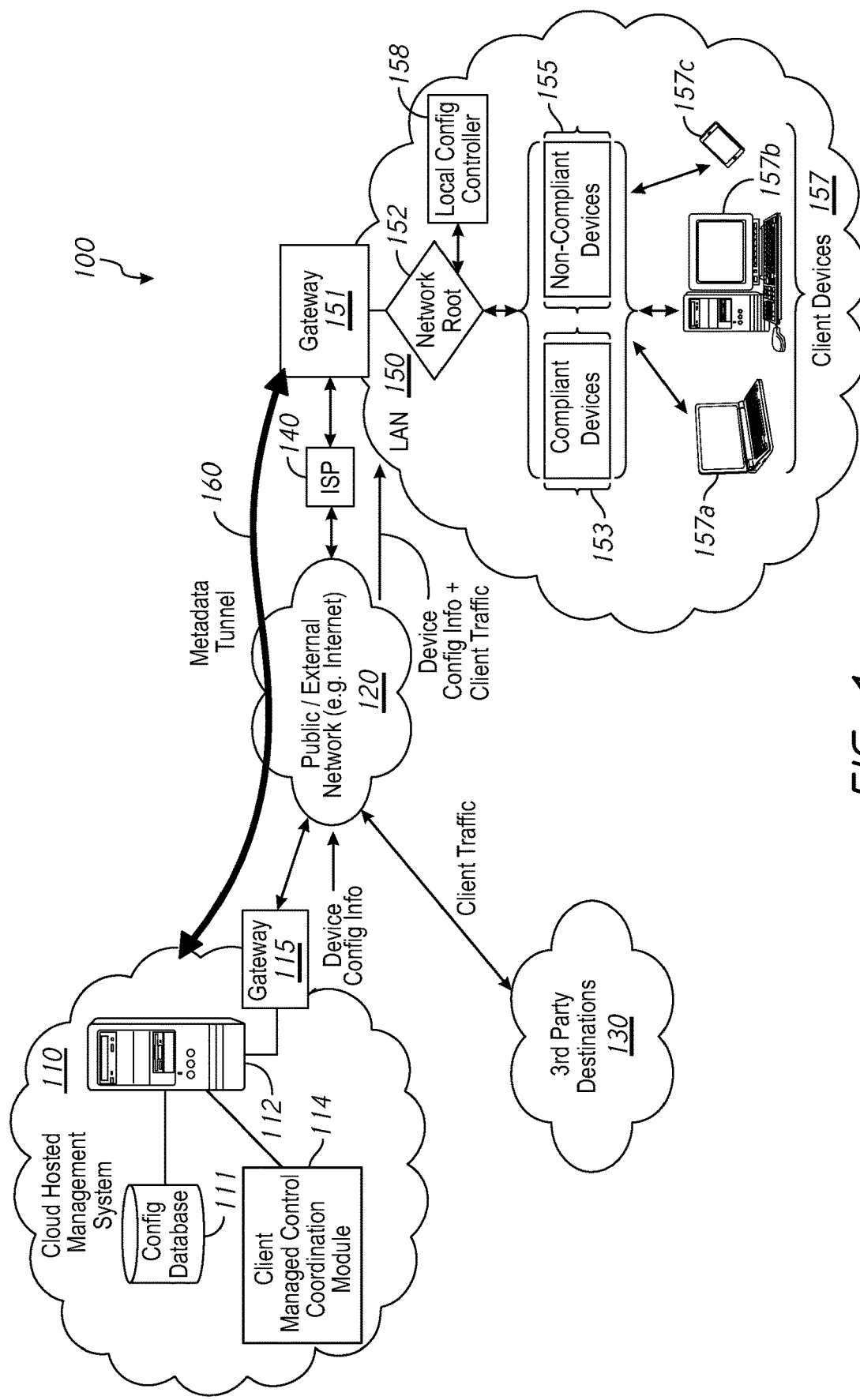
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previously available network management systems fail to enable the private network use of a particular type of equipment, which is configured to operate in coordination with a hosted network management system, without undue risk to connectivity and service failures in the private network. By contrast, various implementations disclosed herein provide private network driven hosted network device management that enables more robust management of private networks that include such equipment. In particular, various implementations disclosed herein enable using networking equipment that is supported by a vendor-provided hosted network management system in combination with a customized private network. For example, in some implementations, a method of private network driven hosted network device management includes receiving a fetch request from a compliant device, wherein the fetch request indicates demand for at least one of new and updated configuration data and instructions. In turn, the method further includes assessing whether or not the new and updated configuration data and instructions, for the requesting compliant device, will conflict with local customizations and indicate potential disruption to connectivity and services in an associated private network, in order to produce an assessment result. The method also includes selectively generating a new configuration file including a suitable set of new and updated configuration data and instructions based on the assessment result.

FIG. 1 is a block diagram of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a public/external network 120 (e.g., a portion of the Internet), one or more third-party destinations 130 (e.g., providing various third-party content and services), a cloud hosted network management system 110, an Internet service provider (ISP) node 140 and a local area network (LAN) 150.

The one or more third-party destinations 130 provide various third-party content and services, such as email, media content (e.g., video, music, gaming, etc.), online banking, social networking servers, etc. Other than providing sources and/or destinations for client data traffic, an exhaustive description of the numerous examples of third-party destinations are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant networking devices 153, a number of non-compliant networking devices 155, a number of client devices 157, and a local configuration (config) controller 158. The gateway device 151 connects the LAN 150 to the public network 120 through the ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical place-holder within the LAN 150. In such instances, the root node 152 merely provides a convenient LAN node that is separate from the gateway node 151. In some implementations, the root node 152 is an actual physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157*a*, workstation 157*b*, smartphone 157*c*, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant networking devices 153 and the non-compliant networking devices 155 is based at least on how uplink metadata is processed by each and/or the extent to which a device is able to functionally cooperate with the cloud hosted network management system 110. In some implementations, a non-compliant device erroneously forwards uplink metadata received from one compliant device to another, even though the non-compliant device correctly routes externally addressed traffic received from the compliant devices. That is, while a non-compliant device correctly routes externally addressed traffic towards the gateway node 151, the non-compliant device also incorrectly forwards uplink metadata because it is not configured to recognize and process uplink metadata properly. By contrast, a compliant device in the hypothetical place of a non-compliant device is configured to recognize uplink metadata as information it should use and not forward from one compliant device to another device. Additionally and/or alternatively, in some implementations, in response to a request to do so, compliant devices report their own uplink metadata (e.g., such as LLDP frames) to a requesting device. Additionally and/or alternatively, in some implementations, in response to a request to do so, compliant devices operate in accordance with configuration instructions, software and/or firmware updates, and rules provided by the cloud hosted network management system 110. To that end, in accordance with some implementations, a metadata tunnel 160 is established from the gateway node 151 of the LAN 150 to the gateway node 115 of the cloud hosted network management system 110.

As noted above, configuration pushes (e.g., from the cloud hosted network management system 110) and configuration pulls (e.g., from compliant devices 153) can cause connectivity and service failures in a private network, such as the LAN 150. To that end, in various implementations, the local configuration controller 158 is configured to enable client customization of the LAN 150 in particular performance areas. In operation within the LAN 150, the local configuration controller 158 is configured to regulate the deployment of new and/or updated configuration instructions, software and/or firmware updates, and rules provided by the cloud hosted network management system 110. In other words the local configuration controller 158 operates to determine which, if any, of new and/or updated configuration instructions, software and/or firmware updates, and rules provided by the cloud hosted network management system 110 are permitted to take effect within the LAN 150 (e.g., a private network). As described in greater detail below with reference to FIGS. 3 and 4, in various implementations, the local configuration controller 158 selectively implements one or more of new and/or updated configuration instructions, software and/or firmware updates, and rules provided by the cloud hosted network management system 110 in accordance with local configurations rules. In some implementations, the local configuration controller 158 prompts manual intervention before permitting implementation of new and/or updated configuration instructions, software and/or firmware updates, and rules provided by the cloud hosted network management system 110. Moreover, while the local configuration controller 158 is illustrated as a single device, those of ordinary skill in the art will appreciate that, in various implementations, the local configuration controller 158 includes one or more devices and a suitable combination of software, hardware and/or firmware distributed throughout the LAN 150.

The cloud hosted network management system 110 is configured to manage the configuration and operation of compliant devices in a LAN and/or across geographically distributed portions of a VLAN in accordance with vendor-provided configuration instructions, software and/or firmware updates, and rules. To that end, the cloud hosted network management system 110 includes a configuration database 111, a cloud hosted management server 112, a client managed control coordination module 114, and a gateway device 115. The gateway device 115 connects the cloud hosted management server 112 to the public network 120 so that the cloud hosted management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

In various implementations, the client managed control coordination module 114 is configured to operate in concert with one or more respective local configuration controllers associated with corresponding private networks. For example, with reference to FIG. 1, the client managed control coordination module 114 operates in coordination with the local configuration controller 158 of the LAN 150 in order reduce service disruptions and/or failures caused by new and/or updated configuration instructions, software and/or firmware updates, and rules available from the cloud hosted network management system 110. Operation of the client managed control coordination module 114 is described in greater detail below with reference to FIGS. 2-4.

In some implementations, the ISP node 140 is provided to link the LAN 150 to the public network 120, and serves as a network service provider access point. Similar to the gateway nodes 115, 151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 2:
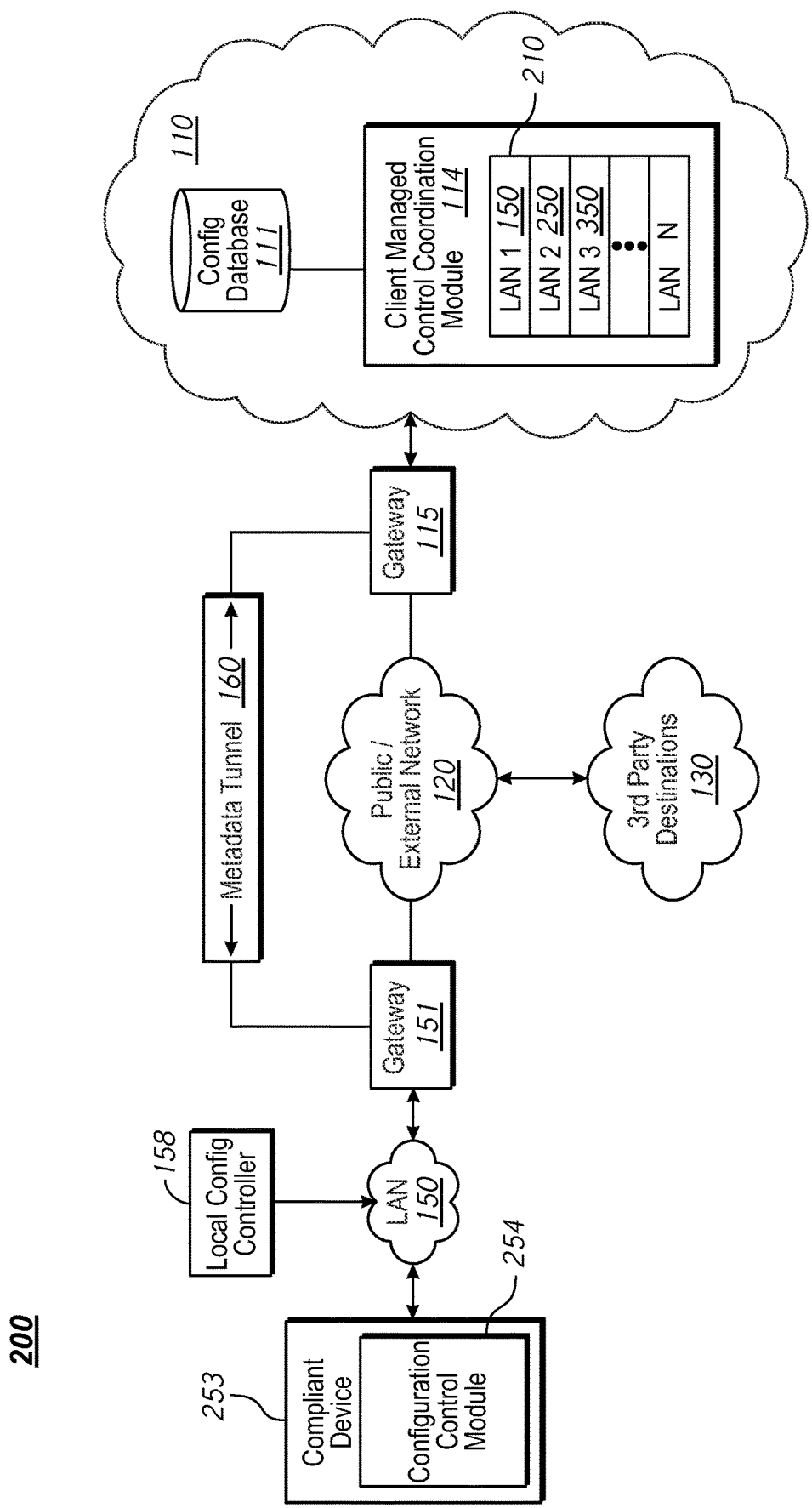
FIG. 2 is a block diagram of a data networking environment in accordance with some implementations.

FIG. 2 is a block diagram of a data networking environment 100 in accordance with some implementations. The data networking environment 200 shown in FIG. 2 is similar to and adapted from the data networking environment 100 shown in FIG. 1. Elements common to FIGS. 1 and 2 include common reference numbers, and only the differences between FIGS. 1 and 2 are described herein for the sake of brevity.

To that end, FIG. 2 illustrates a simplified arrangement including a compliant device 253 shown in the context of a networking environment. The compliant device 253 (e.g., a wireless access point, a router, a switch, etc.) is included in the LAN 150 behind the LAN gateway node 151. In some implementations, the compliant device 253 includes a configuration control module 254. In various implementations, the configuration control module 254 operates to receive and effectuate pushes of new and/or updated configuration instructions, software and/or firmware updates, and rules provided by the cloud hosted network management system 110, and/or effectuate to pulls of the same from the cloud hosted network management system 110. In various implementations, the local configuration controller 158 operates to determine which, if any, of new and/or updated configuration instructions, software and/or firmware updates, and rules provided by the cloud hosted network management system 110 are permitted to take effect. However, in some circumstances a compliant device may inadvertently bypass the control of the local configuration controller 158—such as after power-cycling, or if the compliant device has been newly provisioned and not yet fully configured to operate under the control of the local configuration controller 158.

Additionally, FIG. 2 illustrates the configuration database 111, and the client managed control coordination module 114. As noted above, the client managed control coordination module 114 is configured to operate in concert with one or more respective local configuration controllers associated with corresponding private networks. To that end, in various implementations, the client managed control coordination module 114 includes an allocation of local memory and/or firmware 210. The local memory and/or firmware 210 includes a suitable combination of instructions, heuristics, metadata and/or control logic in order to regulate how and when new and/or updated configuration instructions, software and/or firmware updates, and rules are provided to particular private networks (e.g. LAN 1 (150), LAN 2 (250), LAN 3 (350), etc.) in satisfaction of local customizations.

FIG. 2 also illustrates the metadata tunnel 160 as being a conceptually separate communication channel between the respective gateway nodes 151, 115, as compared to the public/external network 120 (e.g., a portion of the Internet). In some implementations, the metadata tunnel 160 utilizes portions of the public/external network 120. To that end, in some implementations, metadata tunnel packets are marked and/or contain header fields that enable the prioritization of metadata tunnel packets on at least some portions of the public/external network 120. In some implementations, the prioritization of metadata tunnel packets includes the use of dedicated routing paths between client devices and the cloud hosted network management system 110 in order to reduce latency and/or improve reliability. In some implementations, the prioritization of metadata tunnel packets includes bandwidth reservations for metadata tunnel traffic on at least one routing path between one or more client devices and the cloud hosted network management system 110.

Figure 3:
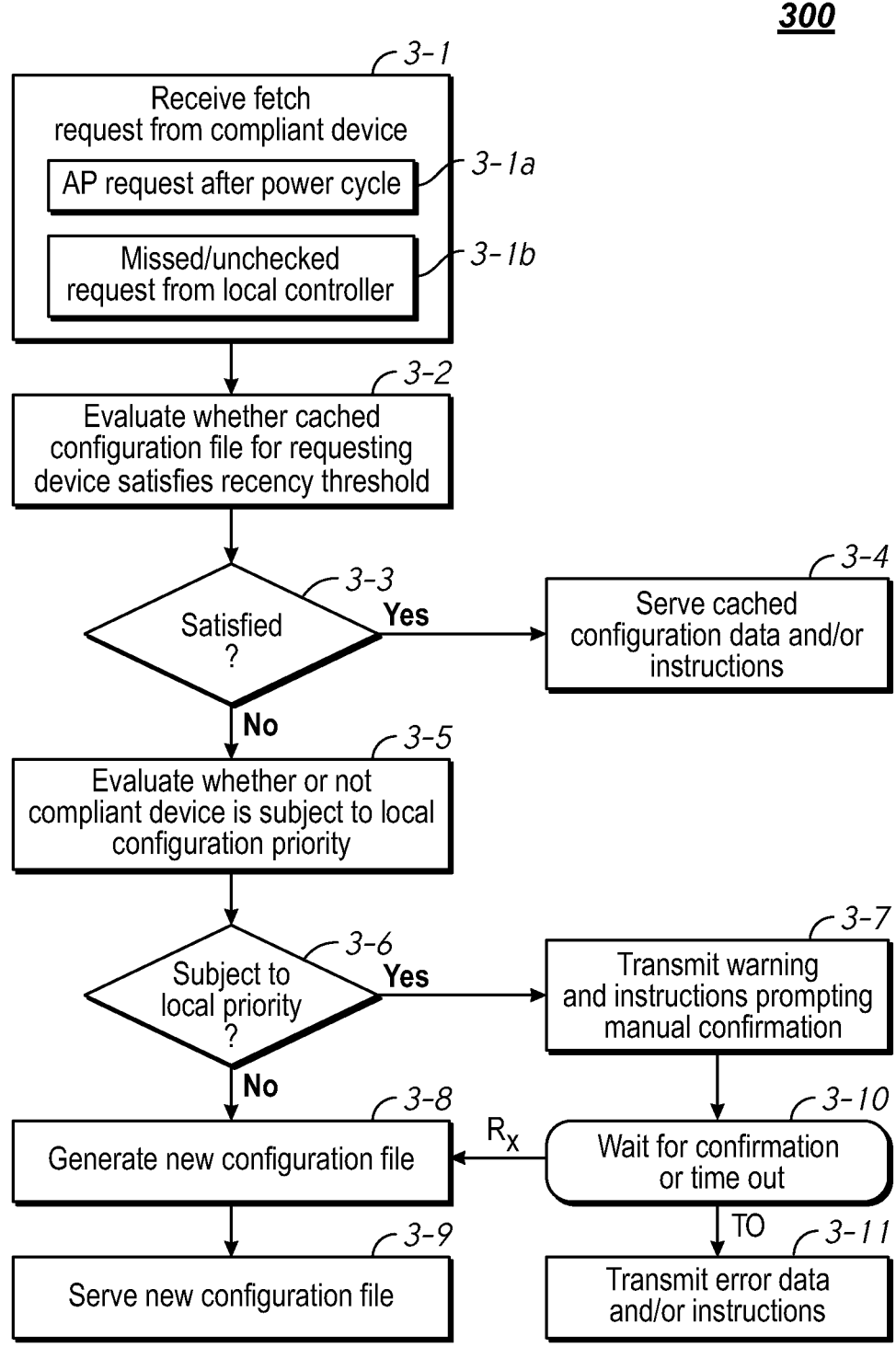
FIG. 3 is a flowchart representation of a method of private network driven hosted network device management in accordance with some implementations.

FIG. 3 is a flowchart representation of a method 300 of private network driven hosted network device management in accordance with some implementations. In various implementations, the method 300 is performed by a client managed control coordination module (e.g., the client managed control coordination module 114 shown in FIGS. 1 and 2) included in and/or associated with a cloud hosted network management system (e.g., the cloud hosted network management system 110 shown in FIGS. 1 and 2). Briefly, the method 300 includes receiving a configuration pull from a compliant device within a private network, and coordinating a response with a local configuration controller in order to regulate how and when new and/or updated configuration instructions, software and/or firmware updates, and rules are provided to the compliant device in satisfaction of local customizations of the private network.

To that end, as represented by block 3-1, in some implementations the method 300 includes receiving a fetch request (e.g., a configuration pull) from a compliant device from a private network. In some implementations, the fetch request indicates compliant device demand for at least one of new or updated configuration data and instructions. In some implementations, the fetch request comprises at least a portion of a configuration pull process initiated by the compliant device. As an example, with reference to FIG. 1, the client managed control coordination module 114 receives a fetch request from a compliant device 153 through the metadata tunnel between the gateway devices 115, 151. In some implementations, as represented by block 3-1a, the fetch request is received as a result of power-cycling (or reboot) of a compliant access point that has momentarily decoupled from the regulation of local control. In some implementations, as represented by block 3-1b, the fetch request is received as a result of a local configuration controller missing or failing to check that particular aspects of new or updated configuration data and/or instructions (etc.) may negatively impact connectivity and/or services in the associated private network.

As represented by block 3-2 in some implementations the method 300 includes evaluating the extent to which a cached configuration file associated with the requesting compliant device satisfies a recency threshold. In some implementations, the recency threshold serves as a proxy that characterizes whether the new or updated configuration data and/or instructions satisfy the local rules of the associated private network. In other words, in some implementations, the recency threshold serves as an initial threshold check that can be used to avoid more stringent assessment of the fetch request, which would require more processing time, more power and reduce the availability and utilization of the compliant device during the more stringent assessment.

As represented by block 3-3, in some implementations the method 300 includes determining whether or not the recency threshold is satisfied based on the evaluation result. If the recency threshold is satisfied based on the evaluation result ("Yes" path from block 3-3), as represented by block 3-4, in some implementations the method 300 includes serving the cached configuration instructions, software and/or firmware updates, and rules provided by the cloud hosted network management system. On the other hand, if the recency threshold is not satisfied based on the evaluation result ("No" path from block 3-3), as represented by block 3-5, in some implementations the method 300 includes evaluating whether or not the requesting compliant device is subject to local configuration priority.

In other words, as represented by block 3-5, the method 300 includes assessing whether new or updated configuration data and/or instructions (for the requesting compliant device) will conflict with local customizations, and in turn, cause disruption to connectivity and/or services in an associated private network. If so, in various implementations, deference to local priority is determined to be a more prudent course. As represented by block 3-6, in some implementations the method 300 includes deciding whether or not the requesting compliant device is subject to local priority based on the assessment. If the compliant device is not subject to local priority ("No" path from block 3-6), as represented by block 3-8, the method 300 includes generating a new and/or updated configuration file. In various implementations, a configuration file includes a combination of configuration data, instructions, software and/or firmware updates, and rules provided by the cloud hosted network management system in order to update the compliant device. Subsequently, as represented by block 3-9, in some implementations the method 300 includes serving the newly generated configuration file to the requesting compliant device.

Referring again to block 3-6, if, on the other hand, the compliant device is subject to local priority ("Yes" path from block 3-6), as represented by block 3-7, in some implementations the method 300 includes transmitting a warning message and/or instructions prompting manual confirmation from local control associated with the private network. In various implementations, the warning message and/or instructions are provided to a local configuration controller associated with the private network including the requesting compliant device. For example, with reference to FIG. 1, the warning and/or instructions are transmitted by the client managed control coordination module 114 to the local configuration controller 158 using the metadata tunnel 160.

Subsequently, as represented by block 3-10, in some implementations the method 300 includes waiting for confirmation for a specified timeout period. If a confirmation is not received from either a local configuration controller or the requesting compliant device within the specified timeout period ("TO" path from block 3-10), as represented by block 3-11, in some implementations the method 300 includes transmitting error data and/or instructions to the local configuration controller or the requesting compliant device. In some implementations, the requesting compliant device may be rendered inoperable or substantially disabled until the error is resolved. On the other hand, if a confirmation is received from either a local configuration controller or the requesting compliant device within the specified timeout period ("Rx" path from block 3-10), the method 300 proceeds to the portion of the method represented by block 3-8 discussed above.

Figure 4:
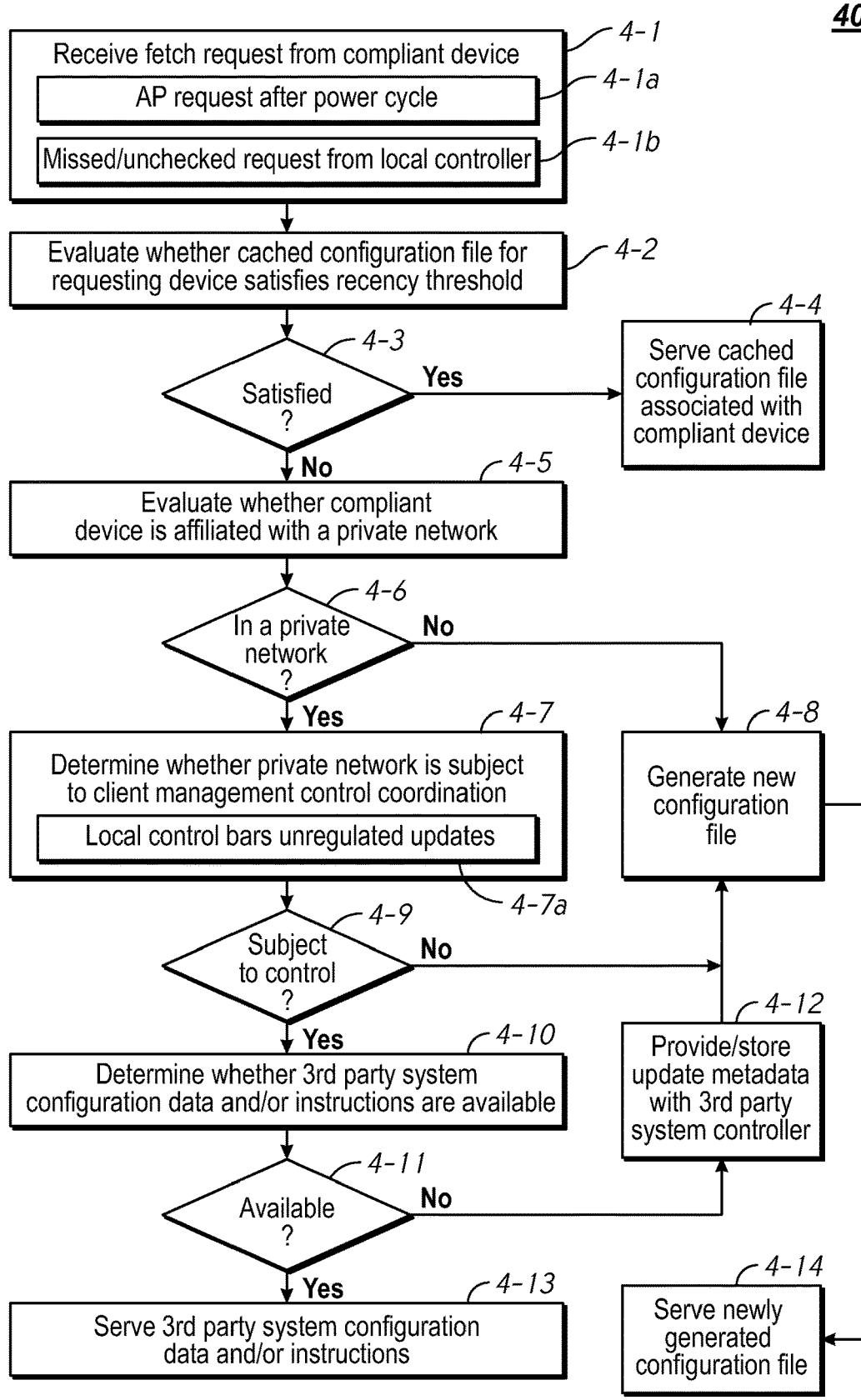
FIG. 4 is a flowchart representation of a method of private network driven hosted network device management in accordance with some implementations.

FIG. 4 is a flowchart representation of a method 400 of private network driven hosted network device management in accordance with some implementations. In various implementations, the method 400 is performed by a client managed control coordination module (e.g., the client managed control coordination module 114 shown in FIGS. 1 and 2) included and/or associated with a cloud hosted network management system (e.g., the cloud hosted network management system 110 shown in FIGS. 1 and 2). Briefly, the method 400 includes receiving a fetch request (e.g., a configuration pull) from a compliant device within a private network, and coordinating a response to the fetch request with a local configuration controller in order to regulate how and when new and/or updated configuration instructions, software and/or firmware updates, and rules are provided to the compliant device in satisfaction of local customizations of the private network.

To that end, as represented by block 4-1, the method 400 includes receiving a fetch request (e.g., a configuration pull) from a compliant device from a private network. As an example, with reference to FIG. 1, the client managed control coordination module 114 receives a fetch request from a compliant device 153 through the metadata tunnel between the gateway devices 115, 151. In some implementations, as represented by block 4-1a, the fetch request is received as a result of power-cycling (or reboot) of a compliant access point that has momentarily decoupled from the regulation of local control. In some implementations, as represented by block 4-1b, the fetch request is received as a result of a local configuration controller missing or failing to check that particular aspects of new or updated configuration data and/or instructions may negatively impact connectivity and/or services in the associated private network.

As represented by block 4-2, in some implementations the method 400 includes evaluating the extent to which a cached configuration file associated with the requesting compliant device satisfies a recency threshold. In some implementations, the recency threshold serves as a proxy that characterizes whether the new or updated configuration data and/or instructions satisfy the local rules of the associated private network. In other words, in some implementations, the recency threshold serves as an initial threshold check that can be used to avoid more stringent assessment of the fetch request, which would require more processing time, more power and reduce the availability of the compliant device during the more stringent assessment.

As represented by block 4-3, in some implementations the method 400 includes determining whether or not the recency threshold is satisfied based on the evaluation result. If the recency threshold is satisfied based on the evaluation result ("Yes" path from block 4-3), as represented by block 4-4, in some implementations the method 400 includes serving the cached configuration instructions, software and/or firmware updates, and rules provided by the cloud hosted network management system. On the other hand, if the recency threshold is not satisfied based on the evaluation result ("No" path from block 4-3), as represented by block 4-5, in some implementations the method 400 includes evaluating whether or not the compliant device is affiliated with a private network. For example, with reference to FIG. 1, the method includes determining the relationship between the compliant device 153 and the LAN 150, as well as local customizations of LAN 150 that affect the compliant device 153. Subsequently, as represented by block 4-6, the method 400 includes deciding whether or not the requesting compliant device is included in a private network based on the assessment. If the compliant device is not in a private network ("No" path from block 4-6), as represented by block 4-8, in some implementations the method 400 includes generating a new and/or updated configuration file (as described above with reference to FIG. 3). Subsequently, as represented by block 4-14, the method 400 includes serving the newly generated configuration file to the requesting compliant device.

Referring again to block 4-6, if, on the other hand, the compliant device is in a private network ("Yes" path from block 4-6), as represented by block 4-7, in some implementations the method 400 includes assessing whether the private network is subject to client managed control coordination as provided by the hosted network management system. For example, with reference to FIG. 2, the cloud hosted management system 110 includes the client managed control coordination module 114—that is configured to operate in concert with one or more respective local configuration controllers associated with one or more corresponding private networks (e.g. LAN 1 (150), LAN 2 (250), LAN 3 (350), etc.). In some implementations, as represented by block 4-7a, assessing whether the private network is subject to client managed control coordination includes determining whether or not local control bars (prohibits) unregulated updates from the cloud hosted management system. Subsequently, as represented by block 4-9, the method 400 includes deciding whether or not the private network is subject to local control based on the assessment. If the private network is not subject to local control ("No" path from block 4-9), the method 400 includes proceeding to the portion of the method represented by block 4-8 described above.

On the other hand, if the private network is subject to local control ("Yes" path from block 4-9), as represented by block 4-10, in some implementations the method 400 assessing whether or not third party system configuration data and/or instructions are available. Subsequently, as represented by block 4-11, the method 400 includes deciding whether third party configuration data and/or instructions are available. If third party configuration data and/or instructions are available ("Yes" path from block 4-11), as represented by block 4-13, in some implementations the method 400 includes serving the third party configuration data and/or instructions to the requesting compliant device. On the other hand, if third party configuration data and/or instructions are not available ("No" path from block 4-11), as represented by block 4-12, in some implementations the method 400 includes providing/storing configuration update metadata with a third party system controller before proceeding to the portion of the method represented by block 4-8 described above.

Figure 5:
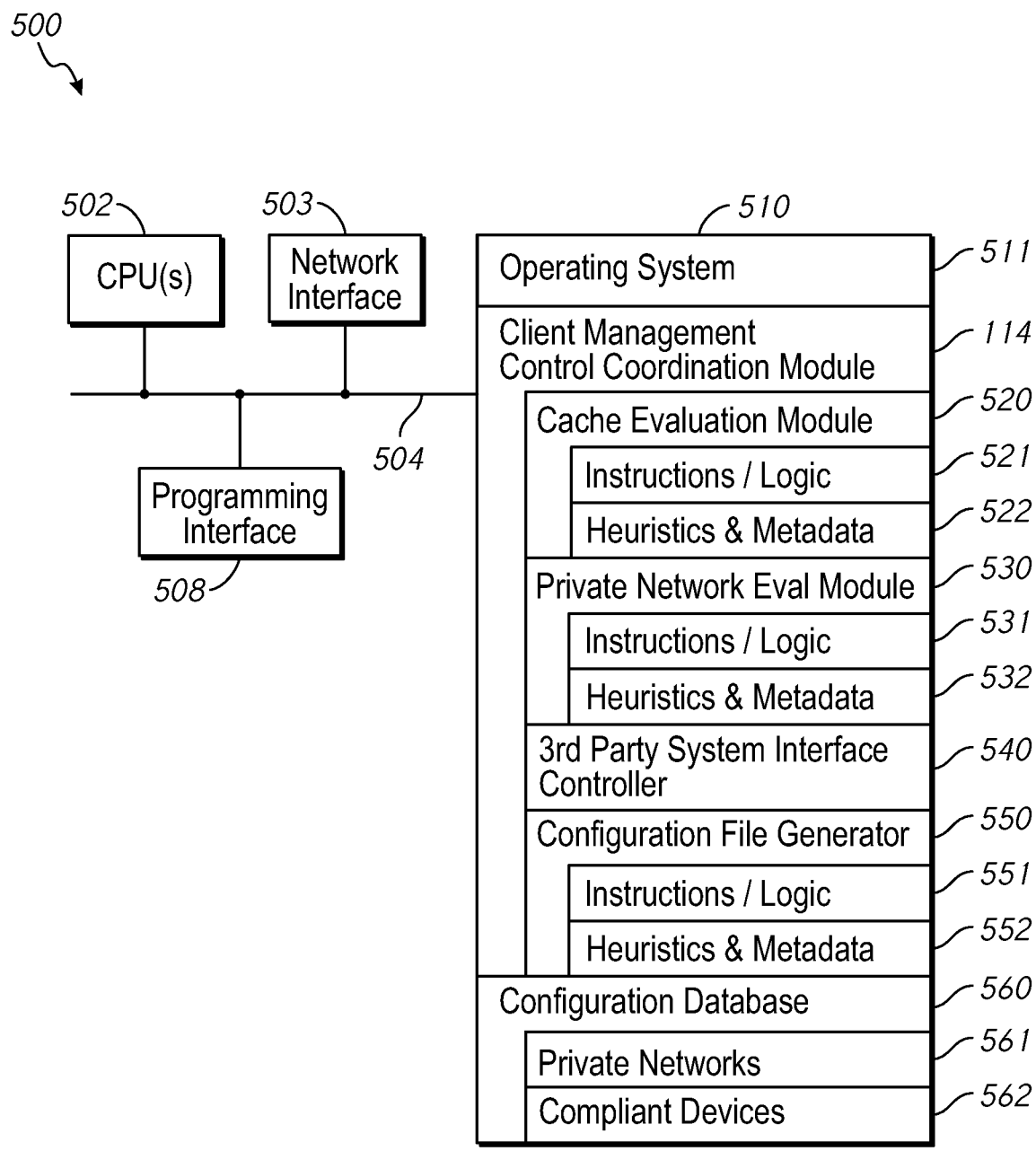
FIG. 5 is a block diagram of a server system enabled with a private network driven hosted network device management system in accordance with some implementations.

FIG. 5 is a block diagram of a server system 500 enabled with a private network driven hosted network device management system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPU's) 502, a network interface 503, a memory 510, a programming interface 508, and one or more communication buses 504 for interconnecting these and various other components.

In some implementations, the network interface 503 is provided to, among other uses, establish and maintain a metadata tunnel between a cloud hosted network management system and at least one private network including one or more compliant devices. For example, with reference to FIG. 1, the metadata tunnel 160 is established and maintained from the gateway node 151 of the LAN 150 to the gateway node 115 of the cloud hosted network management system 110. In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium.

In some implementations, the memory 510 or the non-transitory computer readable storage medium of the memory 510 stores the following programs, modules and data structures, or a subset thereof including an optional operating system 511, a client managed control coordination module 114, and a configuration database 560.

The operating system 511 includes procedures for handling various basic system services and for performing hardware dependent tasks.

In some implementations, the client managed control coordination module 114 is configured to operate in concert with one or more respective local configuration controllers associated with corresponding private networks. For example, with additional reference to FIGS. 1 and 2, the client managed control coordination module 114 operates in coordination with the local configuration controller 158 of the LAN 150 in order reduce service disruptions and/or failures caused by new and/or updated configuration instructions, software and/or firmware updates, and rules available from the cloud hosted network management system 110. To that end, in various implementations, the client managed control coordination module 114 includes a cache evaluation module 520, a private network evaluation module 530, a third party system interface controller 540, and a configuration file generator 550. In various implementations, these and other modules included in the server system 500 include a suitable combination of software, hardware and/or firmware including digital logic, machine-executable computer code instructions and programmable logic.

In some implementations, the cache evaluation module 520 is configured to evaluate the extent to which a cached configuration file associated with the requesting compliant device satisfies a recency threshold. As noted above, in some implementations, the recency threshold serves as a proxy that characterizes whether the new or updated configuration data and/or instructions satisfy the local rules of the associated private network. In other words, in some implementations, the recency threshold serves as an initial threshold check that can be used to avoid more stringent assessment of the fetch request, which would require more processing time, more power and reduce the availability of the compliant device during the more stringent assessment. To that end, in various implementations, the cache evaluation module 520 includes instructions and/or logic 521, and heuristics and metadata 522.

In some implementations, the private network evaluation module 530 is configured to assess whether new or updated configuration data and/or instructions (for the requesting compliant device) will conflict with local customizations, and in turn, cause disruption to connectivity and/or services in an associated private network. In some implementations, the private network evaluation module 530 is configured to evaluate whether or not the compliant device is affiliated with a private network. For example, with reference to FIG. 1, the method includes determining the relationship between the compliant device 153 and the LAN 150, as well as local customizations of LAN 150 that affect the compliant device 153. In some implementations, the private network evaluation module 530 is configured to assess whether the private network is subject to client managed control coordination as provided by the hosted network management system. For example, with additional reference to FIG. 2, the cloud hosted management system 110 includes the client managed control coordination module 114—that is configured to operate in concert with one or more respective local configuration controllers associated with one or more corresponding private networks (e.g. LAN 1 (150), LAN 2 (250), LAN 3 (350), etc.). As described above, in various implementations, assessing whether the private network is subject to client managed control coordination includes determining whether or not local control bars (prohibits) unregulated updates from the cloud hosted management system. To that end, in various implementations, the private network evaluation module 530 includes instructions and/or logic 531, and heuristics and metadata 532.

In some implementations, the third party system interface controller 540 is configured to assessing whether or not third party system configuration data and/or instructions are available, and coordinate the storage of configuration update metadata with a third party system controller.

In some implementations, the configuration file generator 550 is configured to generate a new and/or updated configuration file. In various implementations, a configuration file includes a combination of configuration data, instructions, software and/or firmware updates, and rules provided by the cloud hosted network management system. In various implementations, the configuration file generator 550 is configured to serve newly generated and/or updated configuration data and/or instructions to a requesting compliant device in coordination with the network interface 503. To that end, in various implementations, the configuration file generator 550 includes instructions and/or logic 551, and heuristics and metadata 552.

In some implementations, the configuration database 560 is configured to store and maintain configuration data and/or updates for a number of private networks and associated compliant devices. To that end, in various implementations, the configuration database 560 includes a first allocation of non-transitory memory 561 provided to store and maintain configuration data and/or updates for a number of private networks. Similarly, in various implementations, the configuration database 560 includes a second allocation of non-transitory memory 562 provided to store and maintain configuration data and/or updates for a number of compliant devices.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a server including one or more processors and a non-transitory memory, configured to remotely manage and configure a compliant device associated with and part of a private network, and operate in coordination with a local configuration controller of the private network for selectively implementing configurations of the compliant device in accordance with local configuration rules for customizing the private network:
receiving a fetch request through a metadata tunnel from the compliant device of the customized private network, wherein the fetch request indicates demand for at least one of new and updated configuration data and instructions;

evaluating an extent to which a cached configuration file associated with the compliant device satisfies a recency threshold in order to produce an evaluation result;

if the evaluation result indicates that the recency threshold is satisfied, serving the cached configuration file;

if the evaluation result indicates that the recency threshold is not satisfied:

if the requesting compliant device is subject to a local configuration priority deferring to the local configuration priority; or if the requesting compliant device is not subject to a local configuration priority, assessing whether or not the new and updated configuration data and instructions, for the requesting compliant device, will conflict with local customizations of the customized private network and indicate potential disruption to connectivity and services in the associated customized private network, in order to produce an assessment result; and selectively generating a new configuration file including a set of new and updated configuration data and instructions based on the assessment result, and serving the new configuration file.

2. The method of claim 1, wherein the server comprises a cloud hosted server.

3. The method of claim 1, wherein the new or updated configuration data and instructions comprises a combination of configuration data, instructions, software and firmware updates, and rules provided by a cloud hosted network management system in order to update the compliant device.

4. The method of claim 1, wherein the recency threshold serves as a proxy that characterizes whether the new or updated configuration data and/or instructions satisfy the local configuration rules of the customized private network.

5. The method of claim 1, further comprising transmitting a warning message and instructions prompting manual confirmation from local control associated with the private network in response to determining, from the assessment result, that the new and updated configuration data and instructions, for the requesting compliant device, will conflict with local customizations and indicate potential disruption to connectivity and services in an associated private network.

6. The method of claim 1, further comprising evaluating whether or not the compliant device is affiliated with a particular private network.

7. The method of claim 6, further comprising selectively determining whether the particular private is subject to client managed control coordination as provided by the hosted network management system in response to determining that the compliant device is affiliated with the particular private network.

8. The method of claim 6, wherein the particular private network includes local control that bars unregulated updates from a cloud hosted management system.

9. The method of claim 1, further comprising:

assessing whether or not third party system configuration data and instructions are available in response to a determination that the requesting compliant device is included in a particular private network that is subject to local priority;

selectively serving the third party configuration data and instructions to the requesting compliant device in response to determining availability; and selectively coordinating storage of configuration update metadata with a third party system controller in response to determining unavailability.

10. A server comprising:

one or more processors a network interface of the server; and a client management control coordination module of the server, configured to remotely manage and configure a compliant device associated with and part of a private network, and operate in coordination with a local configuration controller of the private network for selectively implementing configurations of the compliant device in accordance with local configuration rules for customizing the private network, the client management control coordination module being further configured to:

receive, via the network interface, a fetch request through a metadata tunnel from the compliant device in the customized private network, wherein the fetch request indicates demand for at least one of new and updated configuration data and instructions;

evaluate an extent to which a cached configuration file associated with the compliant device satisfies a recency threshold in order to produce an evaluation result;

if the evaluation result indicates that the recency threshold is satisfied, serve the cached configuration file;

if the evaluation result indicates that the recency threshold is not satisfied:

if the requesting compliant device is subject to a local configuration priority defer to the local configuration priority; or if the requesting compliant device is not subject to a local configuration priority, assess whether or not the new and updated configuration data and instructions, for the requesting to compliant device, will conflict with local customizations of the customized private network and indicate potential disruption to connectivity and services in the associated customized private network, in order to produce an assessment result, and selectively generate a new configuration file including a set of new and updated configuration data and instructions based on the assessment result, and serve the new configuration file.

11. The server of claim 10 which comprises a cloud hosted server.

12. The server of claim 10, wherein the recency threshold serves as a proxy that characterizes whether the new or updated configuration data and/or instructions satisfy the local rules of the associated private network.

13. The server of claim 10, wherein the client management control coordination module includes a private network evaluation module configured to evaluating whether or not the compliant device is affiliated with a particular private network.

14. The server of claim 13, wherein the private network evaluation module is also configured to selectively determine whether the particular private is subject to client managed control coordination as provided by the hosted network management system in response to determining that the compliant device is affiliated with the particular private network.

15. The server of claim 13, wherein the particular private network includes local control that bars unregulated updates from a cloud hosted management system.

16. The server of claim 10, wherein the client management control coordination module includes a third party system interface controller configured to:
assess whether or not third party system configuration data and instructions are available in response to a determination that the requesting compliant device is included in a particular private network that is subject to local priority;
selectively serve the third party configuration data and instructions to the requesting compliant device in response to determining availability; and
selectively coordinate storage of configuration update metadata with a third party system controller in response to determining unavailability.

17. A device comprising:
a network interface;
a processor configured to execute computer readable instructions included on a non-transitory memory;
a non-transitory memory including computer readable instructions comprising a client management control coordination module configured to remotely manage and configure a compliant device associated with and part of a private network, and operate in coordination with a local configuration controller of the private network for selectively implementing configurations of the compliant device in accordance with local configuration rules for customizing the private network, the client management control coordination module being further configured to:
receive, via the network interface, a fetch request through a metadata tunnel from the compliant device in the customized private network, wherein the fetch request indicates demand for at least one of new and updated configuration data and instructions;
evaluate an extent to which a cached configuration file associated with the compliant device satisfies a recency threshold in order to produce an evaluation result;
if the evaluation result indicates that the recency threshold is satisfied, serve the cached configuration file;
if the evaluation result indicates that the recency threshold is not satisfied:
if the requesting compliant device is subject to a local configuration priority defer to the local configuration priority; or
if the requesting compliant device is not subject to a local configuration priority, assess whether or not the new and updated configuration data and instructions, for the requesting to compliant device, will conflict with local customizations of the customized private network and indicate potential disruption to connectivity and services in the associated customized private network, in order to produce an assessment result, and
selectively generate a new configuration file including a set of new and updated configuration data and instructions based on the assessment result, and serve the new configuration file.

18. The device of claim 17, wherein the new or updated configuration data and instructions comprises a combination of configuration data, instructions, software and firmware updates, and rules provided by the cloud hosted network management system in order to update the compliant device.

19. The server of claim 10, wherein the client management control coordination module is further configured to receive from the compliant device the fetch request which comprises a missed or unchecked request of the local configuration controller.

20. The server of claim 10, wherein the client management control coordination module is further configured to receive from the compliant device the fetch request as a result of a power-cycling or a new provisioning of the compliant device.

* * * * *